Figure 1:
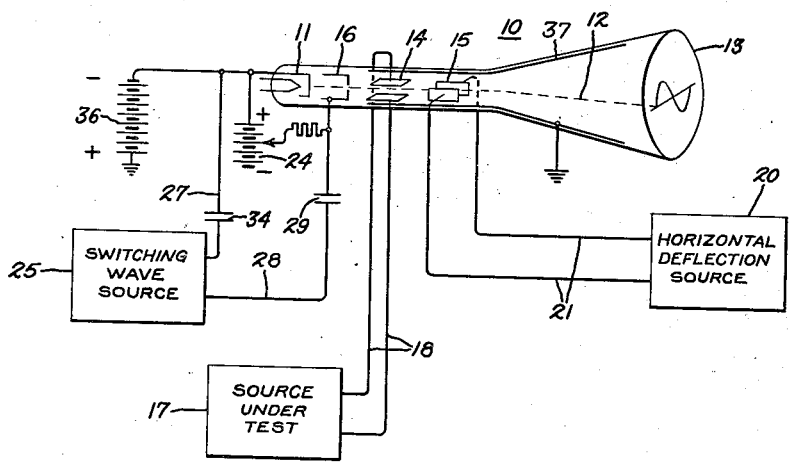

April 21, 1942.  S. HANSEN  2,280,524
ELECTRICAL WAVE ANALYSIS
Filed Nov. 1, 1940  2 Sheets-Sheet 1

Inventor:
Siegfried Hansen,
by Harry E. Dunham
His Attorney.

Patented Apr. 21, 1942

2,280,524

UNITED STATES PATENT OFFICE 2,280,524

ELECTRICAL WAVE ANALYSIS

Siegfried Hansen, Schenectady, N. Y., assignor to General Electric Company, a corporation of New York Application November 1, 1940, Serial No. 363,902

9 Claims. (Cl. 171—95)

My invention relates to a method and apparatus for analyzing the wave forms of electrical waves. While not limited thereto, my invention finds particular application in the accurate reproduction of the wave forms of high frequency waves.

Cathode ray oscilloscopes or oscillographs of the conventional types require a linear sawtooth sweep wave for undistorted reproduction of the wave form of an unknown wave to be analyzed. Furthermore, the fundamental frequency of the sweep wave must be comparable to the frequency of the unknown wave in order to expand the reproduced wave pattern sufficiently for accurate analysis of a small portion including, at most, a relatively few cycles of the unknown wave. At the present time it is difficult to build an oscillator for generating a linear sawtooth sweep wave having a fundamental frequency in excess of about 100,000 cycles. This seriously limits the study of high frequency waves lying in the radio frequency spectrum. For example, with a linear sweep frequency of 100,000 cycles, a radio frequency wave of 10 megacycles produces 100 complete cycles on the relatively short horizontal axis of the sensitive screen of the oscillographic apparatus. The wave pattern is thus so compressed along the reference axis that analysis of the wave shape is virtually impossible.

In the stroboscopic analysis of an object rotating at high speed, it is well known that the object may be made to appear stationary, or to rotate slowly in one direction or another, if it is illuminated by short periodic flashes of light which recur in proper time relation to the speed of rotation. In accordance with my invention an analogous principle is utilized for reducing the apparent frequency of a high frequency wave to a value low enough so that its wave form may be studied in detail with oscillographic apparatus equipped with low frequency sweep circuits.

Briefly, in accordance with a preferred mode of practicing my invention, an unknown high frequency wave to be analyzed and a low frequency sweep wave are applied in the conventional manner to the coordinate deflecting elements of a cathode ray discharge device of known type having a control electrode or grid for controlling the intensity of the cathode ray. A switching wave, composed of short sharp pulses, recurring at a frequency which is a linear function of the frequencies of the deflecting waves, is applied to this grid to modulate the intensity of the cathode ray in a predetermined manner. The intensities of certain portions of the pattern traced by the ray are thereby modified to simulate the appearance of a trace of a small portion of the unknown wave on a greatly expanded scale.

It is therefore an object of my invention to provide an improved method and apparatus for analyzing the wave forms of oscillatory electrical waves.

It is further an object of my invention to provide an improved method and apparatus which has particular utility in the analysis of of the forms of waves of relatively high frequencies lying in the radio frequency spectrum.

It is also a principal object of my invention to provide an improved oscillographic method and apparatus whereby the wave form of an oscillatory electrical wave may be reproduced on a large scale to facilitate accurate analysis thereof.

Another object of my invention is to provide an improved oscillographic method and apparatus, which may utilize a cathode ray device of known form for producing a wave pattern and a relatively low frequency, linear sweep circuit of conventional design for establishing the horizontal time axis, and which is nevertheless suited to the accurate reproduction of a wave of much higher frequency on a linear time axis that is apparently much expanded.

Figure 2:
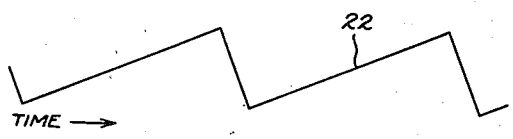
Figure 3:
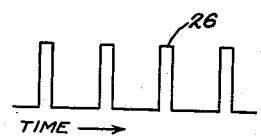
Figure 4:
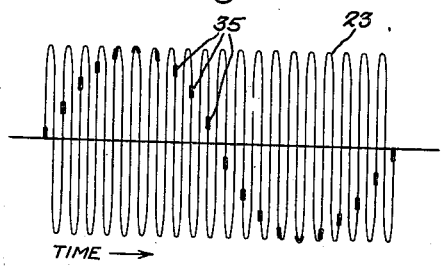
Figure 5:
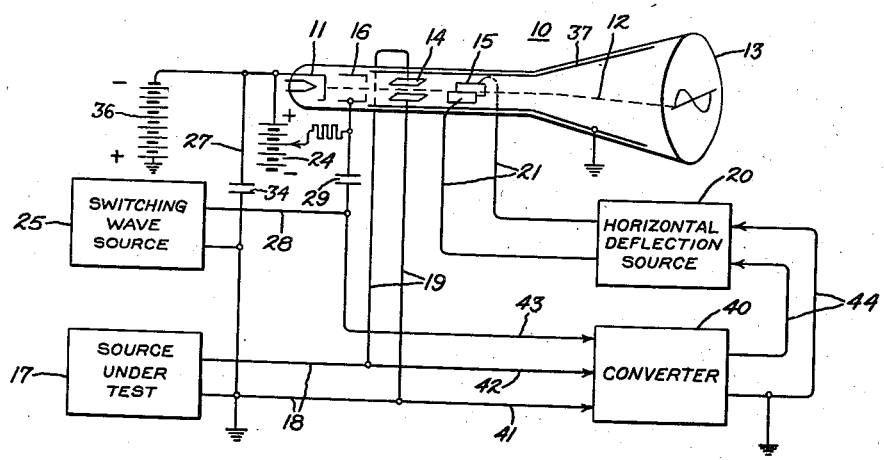
Figure 6:
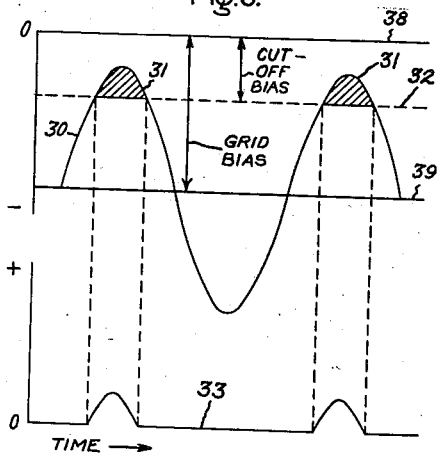

The features of my invention which I believe to be novel are set forth with particularity in the appended claims. My invention itself, however, together with further objects and advantages thereof, may best be understood by reference to the following description taken in connection with the accompanying drawings in which Fig. 1 is a diagrammatic representation of one form of oscillographic apparatus embodying the principles of my invention; Figs. 2 and 3 are graphic representations of the forms of certain electrical waves which may be utilized in the apparatus of Fig. 1; Fig. 4 is a graphic representation of an electrical wave pattern produced by the apparatus of Fig. 1 in accordance with my invention; Fig. 5 is a diagrammatic representation of a modified form of apparatus for carrying out the practice of my invention, and Fig. 6 is a graphic representation of the forms of other electrical waves which may be utilized in the apparatus of Figs. 1 or 5.

The cathode ray discharge device 10 represented in Fig. 1 may take any one of a number of well known forms. A cathode 11 is provided for generating a cathode ray 12 which impinges upon a sensitive screen 13 on the end of the tube envelope. The screen 13 may comprise the usual fluorescent coating for visual observation of the image produced by the ray thereon or a sensitized film for making photographic records. The device 10 also includes means for deflecting the ray in two mutually perpendicular directions. These are illustrated as the transverse pairs of vertical and horizontal electrostatic deflecting plates 14 and 15, though of course magnetic deflecting coils may optionally be used. A control electrode or grid 16 is also provided for controlling the intensity of the cathode ray 12 in accordance with potentials applied thereto. This in turn controls the intensity of the pattern developed on the sensitive screen 13. A source of high potential 36 connected between cathode 11 and a grounded anode 37 provides the accelerating potential for accelerating the ray towards the screen 13. The cathode ray device 10 may also include the usual elements, not shown, for centering and focusing the ray. The details of the various constructional elements of the cathode ray device 10 are immaterial to my invention and are familiar to those skilled in the art.

In the analysis of waves of relatively high frequencies, it is almost always preferable to use an oscilloscope or oscillograph of the cathode ray type illustrated because of the substantially inertialess control of the cathode ray obtainable. However, where the frequencies of the waves applied to the deflecting and intensity control elements are not too high, the electro-optical type of instrument might be used, wherein a light ray, rather than an electron ray, is utilized and wherein electro-mechanical elements are utilized for deflecting and modulating the light beam in a manner familiar to those skilled in the art.

An oscillatory wave, whose wave form is to be analyzed, is supplied to one of the pairs of deflecting elements, preferably to the vertical deflecting plates 14. This is indicated schematically in Fig. 1 by the block 17, representative of the source of waves under test, which is connected to the deflecting plates 14 through the conductors 18.

The horizontal deflecting plates 15 are connected to a horizontal deflection source, represented by the block 20, through the conductors 21. The source 20 generates a sweep wave of a shape and frequency suitable for establishing the horizontal time axis for the wave pattern traced on the screen 13, in the usual manner. Preferably, the wave generated by the source 20 is of substantially linear sawtooth form, such as is indicated graphically by the wave 22 of Fig. 2. Application of the wave 22 to the plates 15 causes the ray to be deflected at a substantially constant time rate in one direction along the horizontal axis and to be returned to its initial position rapidly after a predetermined time interval, as is well known. Various sweep oscillator and multi-vibrator circuits known to the art may be utilized to generate a wave of desired fundamental frequency and of the general form of wave 22.

Assume now for the purposes of illustration that the wave applied to the vertical deflecting plates 14 from source 17 is a sinusoidal radio frequency wave and that the sawtooth wave 22 applied to the deflecting plates 15 from the source 20 has a fundamental frequency which is a relatively low, integral submultiple of the frequency of this radio frequency wave. A standing wave pattern will be traced on the sensitive screen 13, of the form generally illustrated by the wave 23 of Fig. 4. A number of complete cycles of the high frequency wave will be represented in the pattern 23. The number of complete cycles will be equal to the ratio of the fundamental frequencies of the respective waves applied to the deflecting plates 14 and 15, so long as the frequency of the wave applied to plates 15 is lower than, or equal, to that of the wave applied to plates 14. As previously mentioned, there are practical difficulties which make it very difficult to design the horizontal deflection source 20 for the production of saw-tooth waves having a fundamental frequency higher than of the order of approximately 100,000 cycles. Therefore, if the frequency of the source under test is very high, the many individual cycles of the wave 23 will be so compressed that their true wave form is not readily apparent.

The control grid 16 is biased negatively with respect to the cathode 11, as by battery 24, for example. It is generally preferable, in the practice of my invention, to make this bias greater than the negative potential required to cut off the beam current. In such case no visible trace of the pattern 23 will be apparent on the screen 13.

A source of switching waves is further provided for increasing the intensity of the cathode ray intermittently and periodically at a predetermined time rate. This source is indicated schematically by the block 25, which is connected to the cathode 11 through a blocking capacitor 34 and conductor 27 and to the grid 16 through a blocking capacitor 29 and conductor 24. This source develops a wave which periodically renders the grid 16 more positive with respect to the cathode 11 than the voltage resulting in cutoff of the beam current.

The precise wave form of the switching wave and the mode of generation thereof are not important to the practice of my invention. For example, the source may generate a wave composed of relatively short pulses, such as is illustrated graphically by the curve 26 in Fig. 3. The wave 26 is impressed in proper polarity to render the grid 16 more positive with respect to the cathode 11 upon the occurrence of each of the narrow component pulses of wave 26.

Alternatively, certain practical difficulties inherent in the design of high frequency pulse generators may be avoided by utilizing a switching wave of substantially sinusoidal form. Thus, the source 25 may generate a wave such as is illustrated by the curve 30 in Fig. 6. The potential of the cathode 11 is selected as a zero reference level, indicated by the axis 38. The voltage at which the beam current is cut off is represented by the line 32. The grid bias is adjusted so that the sinusoidal variations in grid potential take place about a more negative axis 39 and only the peaks of positive half cycles of wave 30 render the net grid potential less negative than the cutoff value. Thus, as shown in Fig. 6, only the cross-hatched peaks 31 are above the cutoff bias level 32. The resultant variation in beam current, or in screen excitation where a fluorescent screen is used, may be generally illustrated by the wave 33, which consists of short periodic pulses.

Modulation of the intensity of the cathode ray 12 in accordance with the peaks of the switching wave produces a number of visible bright spots 35 in the pattern 22 traced on the sensitive screen 13. The position of these spots in the pattern is dependent upon the frequency of the switching wave relative to the frequencies of the waves applied to the deflecting elements. If the frequency of the switching wave 26 or 33 differs from the frequency of the wave to be analyzed by an amount equal to the fundamental frequency of the horizontal deflection wave 22, the bright spots 35 in the pattern 23 will assume the configuration outlined by the heavier portions of the curve 23, for the assumed case of a sinusoidal wave supplied from source 17.

It will be observed from Fig. 4 that the bright spots 35 occur at progressively displaced points on consecutive cycles of the high frequency pattern 23, thus simulating a continuous curve which is representative of a single cycle of the high frequency wave to be analyzed. An easily visible trace is thus obtained of a single cycle of the high frequency wave on a scale which would be obtainable with conventional apparatus only if the frequency of the horizontal deflection source were made equal to that of the wave under test. However, in accordance with my invention it is possible to use a relatively low frequency horizontal deflection source and the difficulties inherent in the design of a generator of distortionless high frequency sawtooth waves are obviated.

It will be apparent that the above-described method of producing the discontinuous curve 35 electrically is analogous to the stroboscopic method of analysis of mechanical movements. In the latter case the appearance of the moving object, which is being illuminated by short periodic flashes of light, is dependent upon the relationship between the frequency of the flashes and the recurrence rate of the motion of the object. Similarly, in the present apparatus the appearance of the curve 35 depends upon the frequency relationships between the various electrical waves producing it.

The frequency of the switching wave source 25 must be a linear function of the frequencies of both sources 17 and 20. Analysis will also show that, for a configuration representative of a portion of the pattern 23 to be produced, the bright spots 35 must be progressively displaced along the individual cycles represented by the pattern 23. The spots must be spaced apart by a time interval differing from the time interval of one cycle of wave under test or an integral multiple thereof. It can also be shown, as a further condition which must be fulfilled, that the time interval between adjacent spots (i. e., the period of the switching wave) must differ from the time interval of a cycle of the wave under test, or from an integral multiple thereof, by not more than the interval of one-quarter of a cycle of the test wave. If these general requirements are met, the trace of an imaginary curve through the spots 35 will truly simulate a portion of the pattern 23 on an expanded scale.

It is almost invariably desired to have the wave pattern produced by the spots 35 appear stationary on the screen 13. This requires, in addition to the general conditions outlined above, that the frequency of the source 17 must bear an integral relationship to the difference between the frequencies of sources 17 and 25.

For the purposes of simplifying the illustration, both the wave 23 and the spots 35 of Fig. 4 have been represented as stationary. This further requires that the frequencies of sources 17 and 25 be different integral multiples, i. e., different harmonics, of the fundamental frequency of source 20. However, this is not a necessary condition for the pattern simulated by the spots 35 to appear stationary. If these frequencies are not harmonically related the pattern 23, if visible, and the individual spots 35 will appear to "crawl," but the spots 35 will continue to lie on the same imaginary curve through them. This is actually an advantage since the moving spots blend together and enhance the optical illusion of a smooth curve. Furthermore, there is no need to maintain an exact integral relationship between the high frequency and low frequency sources, which is difficult of practical attainment and an unnecessary refinement unless it is desired to have the high frequency pattern 23 also appear stationary.

The above relationships have been given as a guide to the practice of my invention in a preferred embodiment. Other modes of practicing my invention in its essential aspects will doubtless occur to those skilled in the art of oscillographic analysis without further explanation herein. It will be apparent that a wide variety of wave forms may be produced by properly relating the frequencies of the deflecting and switching waves.

The shape and size of each of the luminous spots forming the pattern 35 are determined conjointly by the dimensions of the cathode ray and by the shape of the pulses comprising the switching wave 26 or 30. These factors are readily controllable so that the outlines of the pattern 35 may be adjusted for optimum definition, thus facilitating an accurate analysis of the wave shape.

When the frequency of the test wave supplied by the source 17 is very high, for example in the short or ultra short wave radio spectrum, it has been found difficult, as a practical matter, to maintain a standing image on screen 13 of device 10 because of small amounts of frequency instability in one or more of the wave sources. If only a small section of the high frequency wave is to be represented by the bright spots 35, the switching wave source 25 must also be of a high or ultra high frequency comparable to the frequency of the source 17. It will also be recalled that the fundamental frequency of the horizontal deflection source must be related to the frequency difference between these two high frequencies in a constant integral ratio if a standing wave pattern is to be maintained. Since this latter frequency is a function of the differenece of two very high frequencies of nearly equal magnitudes, even a slight instability in the frequency of source 17 or 25, or both, will cause substantial shifting and distortion of the reproduced wave pattern. Instability in the frequency of source 20 may also cause some further distortion, though this is generally less serious.

A modified form of apparatus for eliminating the effects of frequency instability in the various wave sources is illustrated diagrammatically in Fig. 5. For the most part the component elements of this apparatus are the same as those of the apparatus of Fig. 1. Corresponding reference numerals have been placed upon the corresponding elements of the two figures to facilitate their comparison.

In the circuit of Fig. 5 it will be observed that the outputs of the sources 17, 20 and 25 are coupled to the respective elements of the cathode ray device 10 in the same manner as before. The form of the wave supplied by the horizontal deflection source 20 may again preferably take the general form illustrated in Fig. 2. However, for reasons that will shortly be apparent, it is preferable to generate the switching wave in the manner previously described in connection with Fig. 6, wherein the wave 30 of substantially sinusoidal form is applied to the grid 16 to cause the pulsating variation in beam current, or fluorescent screen excitation, illustrated by the wave 33.

In this modification, the source 17, in addition to being connected to the vertical deflecting plates 14 over the conductors 18 and 19, is also connected to a converter, indicated schematically by the block 40, over the conductors 41 and 42. Similarly, the switching wave source 25, in addition to being connected to the cathode 11 and the grid 16 over conductors 27 and 28, is also connected to the converter 40 over the conductors 42 and 43.

The converter 40 may comprise any one of a number of mixer or heterodyne detector circuits well known to the art. Briefly, in the converter 40 the waves derived from the sources 17 and 25 are combined and a resultant wave, having a frequency equal to the difference between their fundamental frequencies, is selected for transmission to the output circuit of the converter.

It will be apparent to those skilled in the art that the use of a wave 30 of simple sinusoidal wave form simplifies not only the practical design of the converter circuits but also the design of the circuits of the source 25 for generating this wave. However, it is noted here that a switching wave of the form illustrated in Fig. 3 might also be used, at the expense of additional complication of the circuits of the source 25 and of the converter 40, necessitated by the addition of suitable filtering and wave shaping means.

It is well known that a sweep oscillator or multi-vibrator, such as may be used for the horizontal deflection source 20, may readily be synchronized by the injection of alternating potentials of a related frequency. In the embodiments of the invention shown in Fig. 5, the output of the converter 40 is supplied to the horizontal deflection source 20 over the conductors 44 to maintain the fundamental frequency of the horizontal deflection source rigidly synchronized with the frequency of the converter output, in a manner familiar to those skilled in the art.

It will be recalled from the foregoing analysis of the operation of the apparatus of Fig. 1 that the frequency of the source 17 must differ from the frequency of the source 25 by an integral multiple of the frequency of the source 20 if a standing wave pattern is produced. Therefore, the frequency of the control wave, supplied from the converter output to the source 20 over the conductors 44, will likewise be equal to an integral multiple of the desired frequency of source 20. Many forms of multi-vibrator or sweep oscillator circuits are known to the art which are readily synchronized by the application of such a control wave having a frequency which is related to the desired sweep frequency in an integral ratio.

It will thus be apparent that the apparatus of Fig. 5 is ideally suited for the production of wave patterns in accordance with my invention as long as it is desired to have the pattern produced by the bright spots 35 representative of one or more complete cycles of the high frequency wave under test. If the frequency difference between the sources 17 and 25 varies for any reason, the frequency of the output of the converter 40 is likewise varied so that the frequency relationships between them remain fixed. As long as these frequency variations are not so great that synchronization cannot be maintained, the frequency of the horizontal deflection source 20 will be proportionately altered and the wave pattern on the screen will remain stationary.

It is also to be noted that the output wave of the converter 40 may optionally be shaped, by circuits known to the art, to form a sweep wave of predetermined shape and utilized to energize the horizontal deflecting plates 15 directly. In this case, the discontinuous curve delineated by the spots 35 on the screen 13 will always be representative of the wave form of one, and only one, complete cycle of the high frequency wave under test.

Several apparatus have been disclosed in the foregoing specification as constituting the best means known to me for practicing my invention. Those features which I believe to constitute my invention are particularly defined by the appended claims. The modified form of apparatus shown in Fig. 5 and described in the portions of the specification relating thereto also contains certain additional features, in the nature of improvements over my invention, which are not claimed herein. In particular, I refer to those features relating to stabilization of the frequency relationships among the several wave sources. These improvements are the invention of Donald A. Norgaard and are fully disclosed and claimed in his application, Serial No. 363,883, filed concurrently herewith and assigned to the same assignee as the present invention.

It will thus be apparent that I have provided a very simple and flexible method and apparatus for analyzing the forms of electrical waves, particularly those of high frequencies. While I have shown particular apparatus for practicing my invention, it will of course be understood that I do not wish to be limited thereto since various modifications may be made, and I contemplate by the appended claims to cover any such modifications as fall within the true spirit and scope of my invention.

What I claim as new and desire to secure by Letters Patent of the United States, is:

1. The method of analyzing the form of an oscillatory wave which comprises measuring the instantaneous magnitude of said wave at periodically recurring instants of time spaced apart by a time interval differing from the time interval of a cycle of said wave, or differing from an integral multiple thereof, by not more than the time interval of one quarter of a cycle, and indicating each measurement as a function of time.

2. The method of analyzing the wave form of an oscillatory wave which comprises the steps of producing a two dimensional wave pattern representative of the wave form of a plurality of cycles of said wave and altering the intensity of portions of said pattern at discrete points progressively displaced along successive cycles of said wave pattern.

3. The method of analyzing the wave form of an oscillatory electrical wave comprising the steps of producing a two dimensional pattern along coordinate axes, the abscissae of which are proportional to time and the ordinates of which are proportional to the instantaneous amplitude of said wave, and altering the intensity of discrete portions of said pattern on ordinates equally spaced apart along said time axis by an interval differing from the time interval of one cycle of said wave, or differing from an integral multiple thereof, by not more than the time interval of one quarter of a cycle.

4. The method of wave analysis which comprises the steps of developing and projecting a cathode ray, deflecting said ray in one plane in accordance with an oscillatory wave of unknown form to be analyzed, deflecting said ray in a transverse plane in accordance with a wave of predetermined wave form and substantially lower frequency, thereby to cause said ray to trace a predetermined wave pattern having a plurality of successive portions representative of successive cycles of said first wave, and modulating the intensity of said ray intermittently and periodically at points progressively displaced along said successive portions of said pattern.

5. The method of analyzing electrical waves which comprises the steps of developing and projecting a cathode ray of normally low intensity, deflecting said ray in one direction in accordance with an oscillatory wave of a relatively high fundamental frequency and of unknown wave form to be analyzed, deflecting said ray in another direction in accordance with a wave of predetermined wave form and of a substantially lower fundamental frequency, and increasing the intensity of said ray intermittently and at equal time intervals differing from the time period of one cycle of said wave to be analyzed or differing from an integral multiple thereof, by not more than the time period of one fourth of a cycle thereof.

6. The combination, in apparatus for analyzing electrical waves, of a cathode ray discharge device having means therein for developing and projecting a cathode ray against a sensitive surface, means for deflecting said ray in one plane in accordance with an oscillatory wave of unknown form to be analyzed, means for deflecting said ray in a transverse plane in accordance with a wave of predetermined form and substantially lower frequency, whereby a predetermined wave pattern is traced on said surface having a plurality of successive portions representative of successive cycles of said first wave, and means for increasing the intensity of said ray periodically and during short time intervals at a third frequency, said intervals being progressively displaced along said successive portions of said pattern, thereby to alter the intensity of said portions of said pattern in a predetermined configuration.

7. The combination, in apparatus for analyzing electrical waves, of a cathode ray discharge device having means therein for developing and projecting a cathode ray, means for deflecting said ray in one direction in accordance with an oscillatory wave of a relatively high fundamental frequency and of unknown wave form to be analyzed, means for deflecting said ray in another direction in accordance with a wave of a substantially lower fundamental frequency and of predetermined wave form, means for reducing the normal intensity of said ray, and means for varying the intensity of said ray periodically at equal time intervals differing from the time period of one cycle of said wave to be analyzed, or differing from an integral multiple thereof, by not more than the time period of one fourth of a cycle thereof.

8. In apparatus for analyzing the wave forms of high frequency electrical waves, the combination with a cathode ray device having means for developing and projecting a cathode ray against a surface, means for controlling the intensity of said ray and a pair of coordinate ray deflecting means, of means for supplying a first high frequency wave to be analyzed to one of said deflecting means, means for supplying a second, relatively low frequency, sweep wave of substantially linear sawtooth form to said other deflecting means, whereby said ray is caused to trace a predetermined wave pattern on said surface having a plurality of successive portions representative of successive cycles of said first wave, and means for energizing said control means to increase the intensity of said ray during predetermined time intervals which are short as compared with the periodicity of said high frequency wave and which recur intermittently and periodically at a third high frequency, said third frequency differing from said first high frequency by an amount which causes said intervals to be progressively displaced along said successive portions of said pattern, thereby to alter the intensity of said portions of said pattern in a predetermined manner.

9. In oscillographic apparatus for analyzing the wave forms of high frequency electrical waves, the combination with a cathode ray device comprising a sensitive screen, means for developing and projecting a ray against said screen, a pair of coordinate ray deflecting elements for deflecting said ray in mutually perpendicular planes and a control grid, of means for supplying a first high frequency wave to be analyzed to one of said deflecting elements, means for supplying a second, relatively low frequency sweep wave of substantially linear sawtooth form to the other of said deflecting elements, whereby said ray is caused to trace a predetermined wave pattern on said screen, and means for biasing said grid substantially to reduce the intensity of said ray over a major portion of said pattern and to increase its intensity intermittently and periodically, said last means comprising a source of short pulses recurring at a time interval differing from the time period of one cycle of said first wave, or differing from an integral multiple thereof, by not more than the time period of one fourth of a cycle of said first wave, whereby small discrete portions of said pattern are intensified in a configuration representative of a portion of said pattern on an expanded time scale.

SIEGFRIED HANSEN.